(12) United States Patent
Jovancicevic et al.

(10) Patent No.: US 11,091,998 B2
(45) Date of Patent: Aug. 17, 2021

(54) DOWNHOLE CORROSION, EROSION, SCALE AND DEPOSIT MONITORING SYSTEM

(71) Applicant: Saudi Arabian Oil Company, Dhahran (SA)

(72) Inventors: Vladimir Jovancicevic, Richmond, TX (US); Sunder Ramachandran, Houston, TX (US); Amro Mukhles, Udhailiyah (SA); Irfan Syafii, Udhailiyah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 66 days.

(21) Appl. No.: 16/219,259

(22) Filed: Dec. 13, 2018

(65) Prior Publication Data

US 2019/0112911 A1 Apr. 18, 2019

Related U.S. Application Data

(62) Division of application No. 15/423,158, filed on Feb. 2, 2017.

(60) Provisional application No. 62/293,021, filed on Feb. 9, 2016.

(51) Int. Cl.
*E21B 47/00* (2012.01)
*E21B 41/02* (2006.01)
*G01N 17/04* (2006.01)
*E21B 17/042* (2006.01)

(52) U.S. Cl.
CPC .............. *E21B 47/00* (2013.01); *E21B 41/02* (2013.01); *G01N 17/046* (2013.01); *E21B 17/042* (2013.01)

(58) Field of Classification Search
CPC ........ G01N 17/046; E21B 47/00; E21B 41/02
See application file for complete search history.

(56) References Cited

U.S. PATENT DOCUMENTS

| | | | | |
|---|---|---|---|---|
| 1,804,078 | A | * | 5/1931 | Baden ................... C23F 13/02 |
| | | | | 166/66.4 |
| 3,418,848 | A | * | 12/1968 | Schaschl ............... G01N 17/00 |
| | | | | 73/86 |
| 3,486,996 | A | | 12/1969 | Annand |
| 3,491,012 | A | | 1/1970 | Winslow, Jr. |

(Continued)

FOREIGN PATENT DOCUMENTS

CN     203559897 U  *  4/2014

OTHER PUBLICATIONS

ASTM G31-72(2004), Standard Practice for Laboratory Immersion Corrosion Testing of Metals. DOI: 10.1520/G0031-72R04 (Year : 2004).*

*Primary Examiner* — Blake E Michener
*Assistant Examiner* — Theodore N Yao
(74) *Attorney, Agent, or Firm* — Bracewell LLP; Constance G. Rhebergen; Linda L. Morgan

(57) ABSTRACT

A tool for monitoring conditions within a subterranean well includes a first body segment, the first body segment being an elongated member with an axial protrusion having a reduced outer diameter. A second body segment is sized for mating with the first body segment. A metal specimen circumscribes the axial protrusion of the first body segment so that an outer diameter surface of the metal specimen defines an outer diameter of the tool. A connection assembly releasably secures the first body segment to the second body segment.

12 Claims, 3 Drawing Sheets

(56) References Cited

U.S. PATENT DOCUMENTS

| | | | |
|---|---|---|---|
| 4,267,148 A | | 5/1981 | Dickson et al. |
| 4,338,097 A | | 7/1982 | Turner et al. |
| 4,603,113 A | | 7/1986 | Bauer |
| 4,605,065 A | | 8/1986 | Abercrombie |
| 4,627,905 A | * | 12/1986 | Garner .................. G01N 17/02 204/196.06 |
| 4,688,638 A | | 8/1987 | Williams |
| 4,928,760 A | | 5/1990 | Freitas |
| 5,095,977 A | | 3/1992 | Ford |
| 5,627,749 A | | 5/1997 | Waterman et al. |
| 5,639,959 A | | 6/1997 | Reiber |
| 6,241,029 B1 | | 6/2001 | Coenen et al. |
| 7,025,138 B2 | | 4/2006 | Kurkjian et al. |
| 7,723,989 B2 | | 5/2010 | He et al. |
| 7,915,901 B2 | | 3/2011 | Bell et al. |
| 8,561,694 B2 | | 10/2013 | Hemblade |
| 2011/0283783 A1 | | 11/2011 | Al-Jutaily |
| 2012/0007617 A1 | * | 1/2012 | Fisseler .................. G01N 17/02 324/700 |
| 2016/0061028 A1 | | 3/2016 | Teale et al. |
| 2020/0003044 A1 | * | 1/2020 | Pietravalli ............... E21B 23/02 |

\* cited by examiner

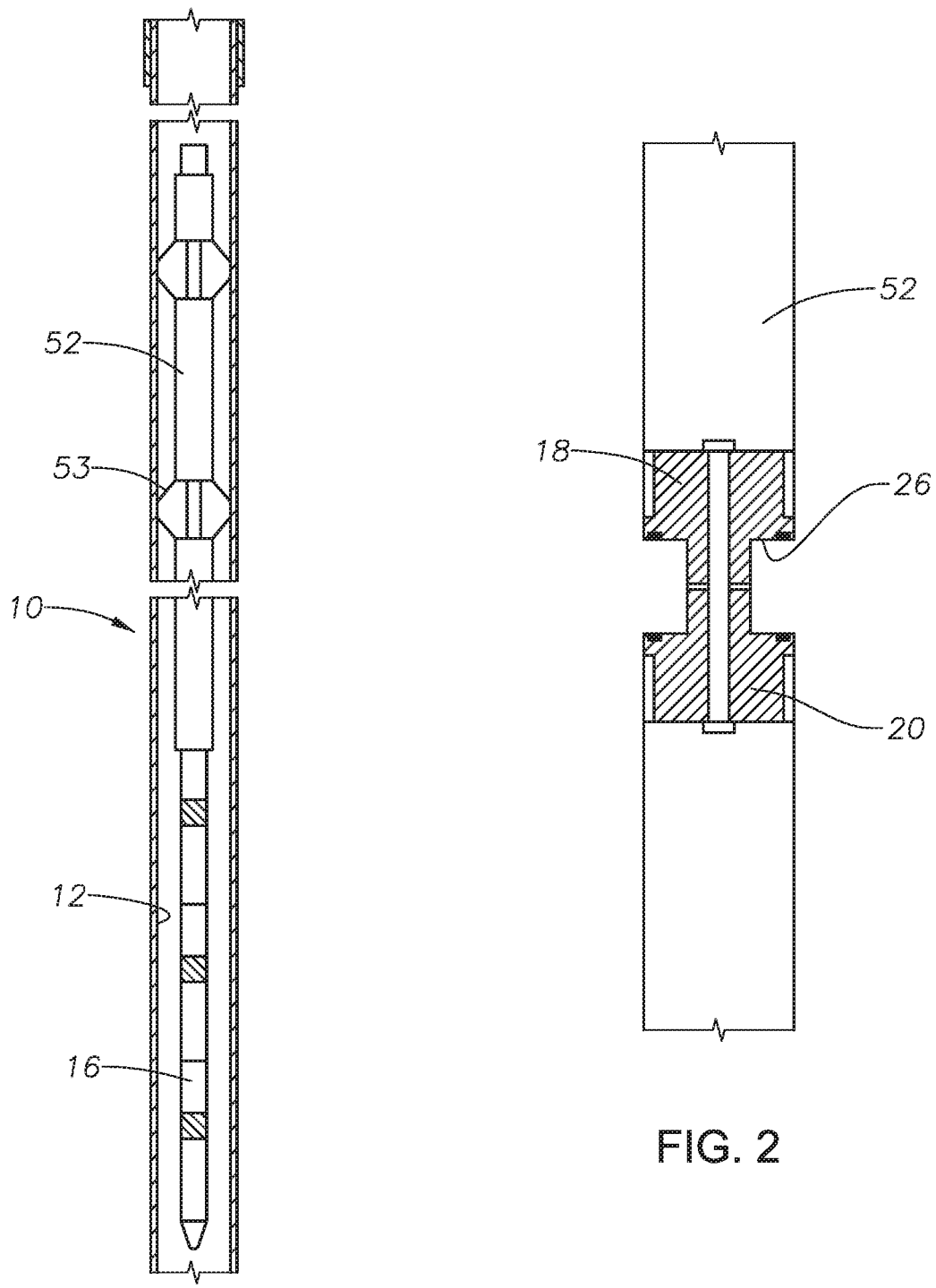

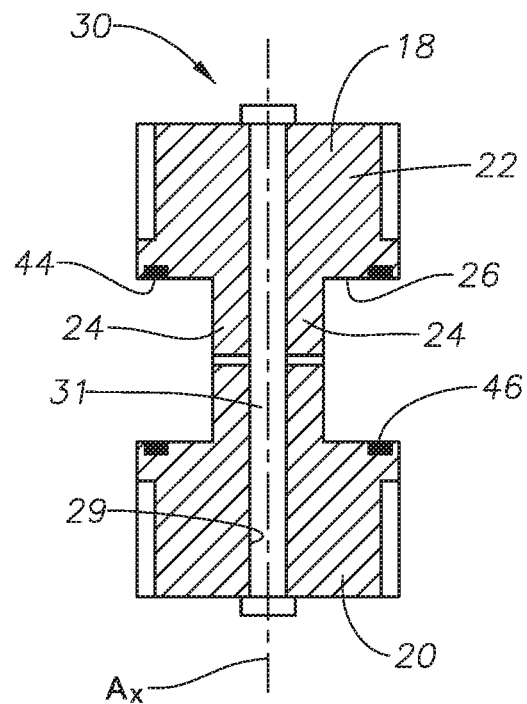
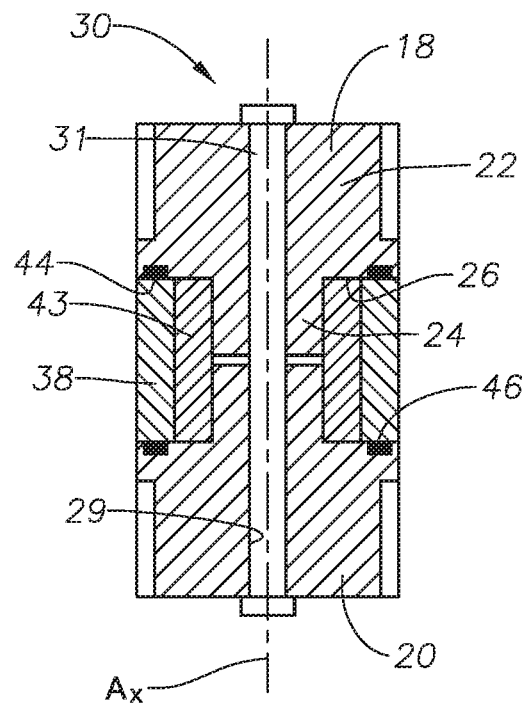
FIG. 3      FIG. 4
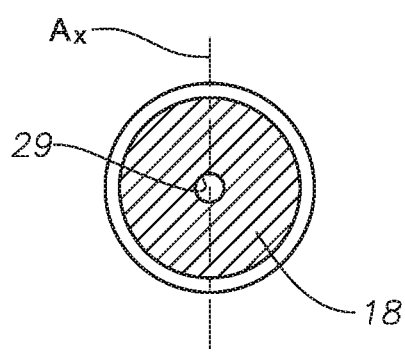
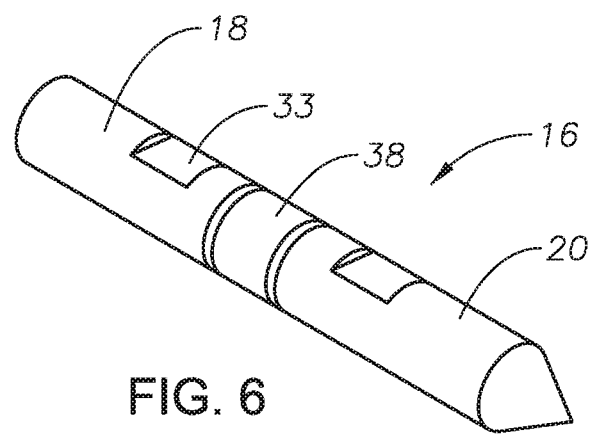
FIG. 5      FIG. 6

DOWNHOLE CORROSION, EROSION, SCALE AND DEPOSIT MONITORING SYSTEM

CROSS REFERENCE TO RELATED APPLICATION

This application is a divisional of and claims priority to and the benefit of co-pending U.S. Nonprovisional application Ser. No. 15/423,158, filed Feb. 2, 2017, titled "Downhole Corrosion, Erosion, Scale And Deposit Monitoring System," which claims priority to and the benefit of U.S. Provisional Application Ser. No. 62/293,021, filed Feb. 9, 2016, titled "Downhole Corrosion, Erosion, Scale And Deposit Monitoring System," the full disclosure of each of which is hereby incorporated herein by reference in its entirety for all purposes.

BACKGROUND OF THE DISCLOSURE

1. Field of the Disclosure

The disclosure relates generally to downhole monitoring of well conditions, and more particularly to quantifying corrosion, erosion, scale and deposit formation in within a subterranean well.

2. Description of the Related Art

Ageing hydrocarbon development and production wells can develop corrosion, erosion and scale that give rise to a maintenance issues for operators. Corrosion, erosion and scale can increase operating costs and lead to the shutdown of the wells. In order to determine the most cost effective methods for treating the wells and minimizing downhole corrosion, erosion and scale, the monitoring systems and methods for determining the extent and nature of the corrosion, erosion and scale are used.

Current systems and methods of monitoring the corrosion, erosion and scale within a wellbore can include a tool that has a test coupon that is shielded from the direct flow of fluids within the well and redirects the flow of fluid over the test piece so that the flow across the test coupon has been disturbed before reaching the test coupon.

SUMMARY OF THE DISCLOSURE

Embodiments disclosed herein describe systems and methods for monitoring conditions within a subterranean well. Embodiments of this disclosure include a metal specimen that is placed on the outside of the downhole system assembly to more closely simulate the corrosion, erosion and scaling conditions, as well as the flow regimes in oil and gas wells. Features of this disclosure include the sealing and isolation of parts contacting the metal specimen, tight spacing between the metal specimen and tool body as well as the between the tool body parts, and a large surface area of the metal specimen that is exposed directly to the flow regime for gathering downhole corrosion, erosion, scale, and deposit data.

In an embodiment of this disclosure, a tool for monitoring conditions within a subterranean well includes a first body segment, the first body segment being an elongated member with an axial protrusion having a reduced outer diameter. A second body segment is sized for mating with the first body segment. A metal specimen circumscribes the axial protrusion of the first body segment so that an outer diameter surface of the metal specimen defines an outer diameter of the tool. A connection assembly releasably secures the first body segment to the second body segment.

In alternate embodiments, the tool can further include an annular shoulder at an end of the axial protrusion, and the metal specimen can be located between the annular shoulder and the second body segment. The connection assembly can include a threaded member extending between the first body segment and the second body segment. A mating assembly can be located at each end of the metal specimen and can separate the metal specimen from the first body segment and from the second body segment. A mating assembly can be located between the first body segment and the second body segment.

In other alternate embodiments, the tool can include an outer connection in one of the first body segment and the second body segment, the outer connection sized to engage an intervention member that is operable to suspend the monitoring tool within the subterranean well. The metal specimen can circumscribe both the first body segment and the second body segment. The outer diameter surface of the metal specimen can be flush with an outer diameter of at least one of the first body segment and the second body segment.

In an alternate embodiment of this disclosure, a system for monitoring conditions within a subterranean well includes a monitoring tool having a first body segment releasably secured to a second body segment, the first body segment having an axial protrusion with a reduced outer diameter. A metal specimen circumscribes the axial protrusion so that an outer diameter surface of the metal specimen defines an outer diameter of the tool. An outer connection is located in one of the first body segment and the second body segment. An intervention member is connected to the outer connection, the intervention member having a gripping member moveable between a retracted position and an extended position, wherein when the gripping member is in the extended position, the intervention member is operable to suspend the monitoring tool within the subterranean well.

In alternate embodiments, the intervention member can include a shock absorber. The monitoring tool can be shaped so that the outer diameter surface of the metal specimen is located in a direct undisturbed flow of fluids through the subterranean well when the monitoring tool is lowered within the subterranean well. A mating assembly can be located at each end of the metal specimen isolating the metal specimen from direct contact with the first body segment and the second body segment. The mating assembly can be formed of a non-metallic and electrically isolating material.

In yet another alternate embodiment of this disclosure, a method for monitoring conditions within a subterranean well includes providing a monitoring tool having a first body segment, the first body segment being an elongated member with an axial protrusion having a reduced outer diameter, and a second body segment sized for mating with the first body segment. The axial protrusion of the first body segment can be circumscribed with a metal specimen so that an outer diameter surface of the metal specimen defines an outer diameter of the monitoring tool. The first body segment can be releasably secured to the second body segment. An intervention member can be secured to an outer connection of one of the first body segment and the second body segment. The monitoring tool can be lowered into the subterranean well with the intervention member.

In alternate embodiments, before circumscribing the axial protrusion of the first body segment with the metal specimen, at least one of a weight and profile of the metal specimen can be measured. The monitoring tool can be raised out of the subterranean well with the intervention member and at least one of a weight and profile of the metal specimen can be measured. After raising the monitoring tool out of the subterranean well with the intervention member and measuring a feature of the metal specimen, a treatment of the subterranean well can be optimized based on the measurement of the feature, the treatment being one of a scale treatment or a corrosion treatment.

In other alternate embodiments, the monitoring tool can be located in a flow of fluids through the subterranean well so that the outer diameter surface of the metal specimen is located in a direct undisturbed flow of the fluids through the subterranean well. A gripping member of the intervention member can be moved to an extended position so that the gripping member engages an inner diameter surface of the subterranean well and supports the monitoring tool within the subterranean well. One or more additional monitoring tools can be secured to the outer connection before lowering the monitoring tool into the subterranean well. A composition of the metal specimen of each monitoring tool can be different from the composition of the metal specimen of other monitoring tools.

BRIEF DESCRIPTION OF THE DRAWINGS

So that the manner in which the above-recited features, aspects and advantages of the embodiments of this disclosure, as well as others that will become apparent, are attained and can be understood in detail, a more particular description of the disclosure briefly summarized above may be had by reference to the embodiments thereof that are illustrated in the drawings that form a part of this specification. It is to be noted, however, that the appended drawings illustrate only preferred embodiments of the disclosure and are, therefore, not to be considered limiting of the disclosure's scope, for the disclosure may admit to other equally effective embodiments.

FIG. 1 is a schematic view of a monitoring system of a subterranean well, in accordance with an embodiment of this disclosure FIG. 2, is a perspective view of a monitoring tool, in accordance with an embodiment of this disclosure.

FIG. 3, is a section view of a portion of the monitoring tool of FIG. 2.

FIG. 4, is a perspective view of a monitoring tool, in accordance with an embodiment of this disclosure.

FIG. 5, is a cross sectional view of the monitoring tool of FIG. 4.

FIG. 6, is a perspective view of a monitoring tool, in accordance with an embodiment of this disclosure.

DETAILED DESCRIPTION

Embodiments of the present disclosure will now be described more fully hereinafter with reference to the accompanying drawings which illustrate embodiments of the disclosure. Systems and methods of this disclosure may, however, be embodied in many different forms and should not be construed as limited to the illustrated embodiments set forth herein. Rather, these embodiments are provided so that this disclosure will be thorough and complete, and will fully convey the scope of the disclosure to those skilled in the art. Like numbers refer to like elements throughout, and the prime notation, if used, indicates similar elements in alternative embodiments or positions.

In the following discussion, numerous specific details are set forth to provide a thorough understanding of the present disclosure. However, it will be obvious to those skilled in the art that embodiments of the present disclosure can be practiced without such specific details. Additionally, for the most part, details concerning well drilling, reservoir testing, well completion and the like have been omitted inasmuch as such details are not considered necessary to obtain a complete understanding of the present disclosure, and are considered to be within the skills of persons skilled in the relevant art.

Looking at FIG. 1, a hydrocarbon development and production operation can include subterranean well 10. Subterranean well 10 has wellbore 12 that extends from a wellhead assembly (not shown). The wellhead assembly sits atop subterranean well 10 to manage fluids flowing into and out of subterranean well 10. Subterranean well 10 can be used to produce oil, gas, and can be used to inject and produce other fluids that are associated with oil and gas production. A communication and control module can be used to monitor, manage, and control the operations at subterranean well 10. Monitoring tool 16 can be used to determine certain conditions within subterranean well 10, such as quantifying corrosion, erosion, scale and deposit formation in within subterranean well 10, as disclosed herein.

Figure 7:
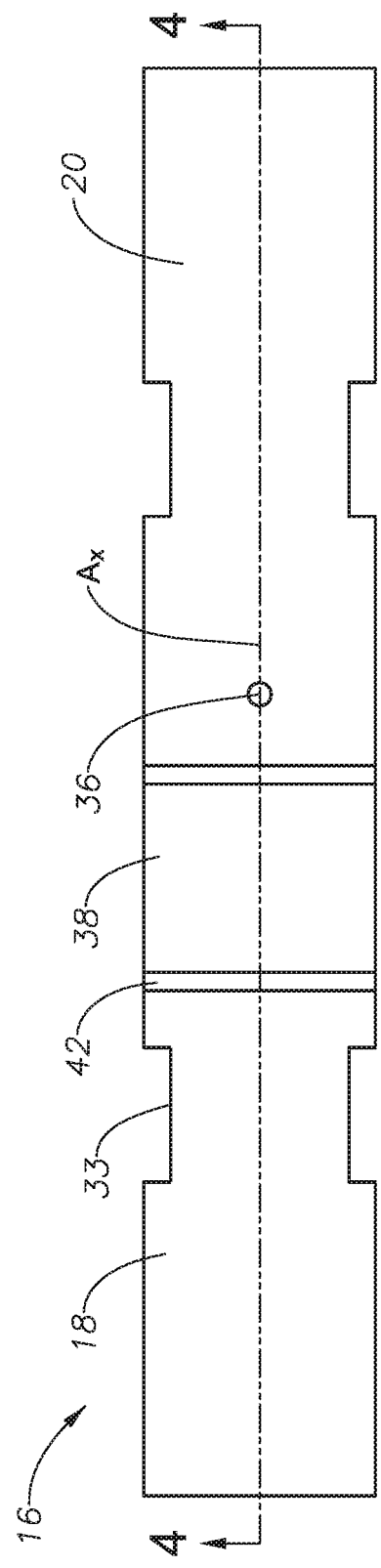
FIG. 7 is a side view of a monitoring tool, in accordance with an embodiment of this disclosure.
Figure 8:
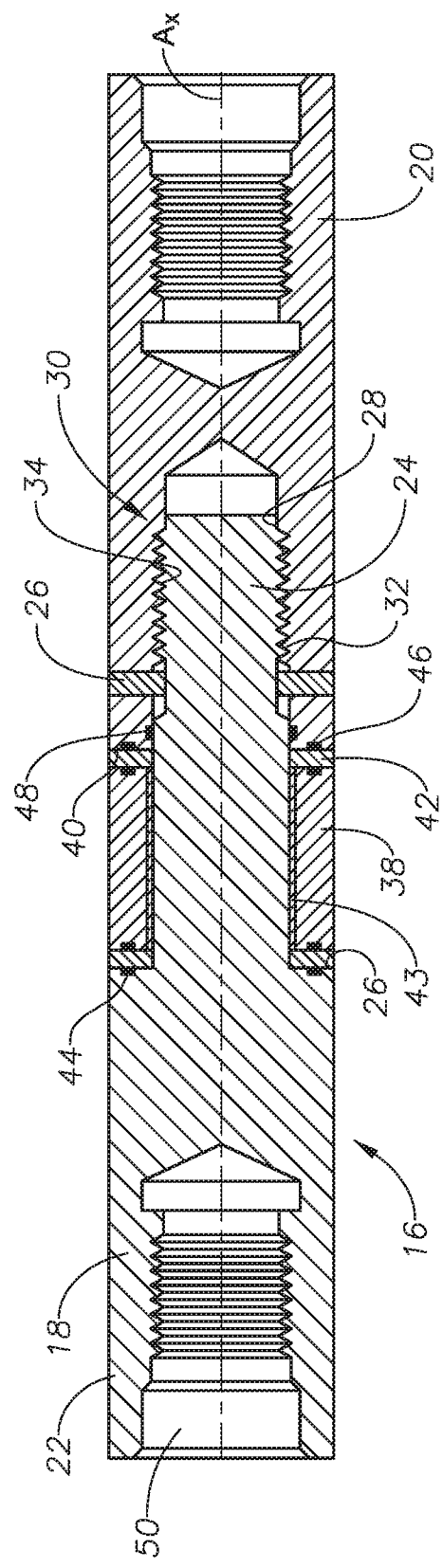
FIG. 8 is a section view of the monitoring tool of FIG. 7, viewed along the section line shown in FIG. 7.

Looking at FIGS. 3 and 8, monitoring tool 16 can include first body segment 18 and second body segment 20. First body segment 18 can be an elongated member with an axis Ax. First body segment 18 can be, as an example, a generally cylindrical shaped member. First body segment 18 can have base body portion 22 and axial protrusion 24 with a reduced outer diameter. Annular shoulder 26 is located at a transition between base body portion 22 and axial protrusion 24. Annular shoulder 26 can have a surface that is generally normal to axis Ax.

Second body segment 20 can also be an elongated member. Second body segment 20 can also have a generally cylindrical shape. Looking at the example of FIG. 3, second body segment 20 can have the same or similar shape as first body segment 18. In such an embodiment the axial protrusion of each axial protrusion 24 will be proximate to each other when first body segment 18 is releasably secured to second body segment 20. In an alternate example of FIG. 8, second body segment 20 can have inner recess 28 that is sized for mating with axial protrusion 24.

Connection assembly 30 can releasably secure first body segment 18 to second body segment 20. In the example embodiment of FIGS. 3-4, connection assembly 30 can include a central bore 29 that extends along axis Ax through both first body segment 18 and second body segment 20. Retaining member 31 extends through central bore 29 and can releasably secure first body segment to second body segment. As an example, retaining member 31 can be a threaded member that threads into first body segment 18 or second body segment 20 or can have a nut that is threaded onto retaining member 31.

In the alternate example embodiment of FIG. 8, connection assembly 30 includes outer threads 32 on an outer surface of axial protrusion 24 and mating threads 34 on an inner surface of inner recess 28. Axial protrusion 24 can be threaded into inner recess 28 in order to releasably secure first body segment 18 to second body segment 20. In order to facilitate the threading of axial protrusion 24 into inner recess 28, tool profile 33 can be provided on an outer diameter or end surface of first body segment 18 and second body segment 20. A hand tool can be used to grip tool profile 33 to rotate one of first body segment 18 and second body segment 20 relative to the other.

In order to prevent first body segment 18 from being separated from second body segment 20, connection assembly 30 can also include set screw 36. Set screw 36 can extend between first body segment 18 and second body segment 20, preventing relative rotational or relative axial movement between first body segment 18 and second body segment 20. The alignment of set screw 36 between first body segment 18 and second body segment 20 also ensures that first body segment 18 and second body segment 20 have been properly engaged. An operator can rotate one of first body segment 18 and second body segment 20 relative to the other until the opening or recess within first body segment 18 and second body segment 20 to accommodated set screw 36 align, and such alignment can ensure full sealing engagement between the components of monitoring tool 16.

Monitoring tool 16 also includes metal specimen 38. Metal specimen 38 can circumscribe axial protrusion 24 of first body segment 18. Metal specimen 38 can be, for example, a ring shaped member. Metal specimen 38 is located on an outermost external surface of first body segment 18 so that metal specimen 38 defines an outer diameter of monitoring tool 16. In embodiments of this disclosure, metal specimen 38 has an outer diameter that is flush with the outer diameter of first body segment 18 and second body segment 20. In such an embodiment, there will be minimal disruption to the flow of fluid over metal specimen 38 and a most accurate estimation of the flow can be obtained. In alternate embodiments, the outer diameter of metal specimen 38 can be slightly recessed relating to the outer diameter of first body segment 18 and second body segment 20. In such an embodiment, the outer diameter surface of metal specimen 38 will be less than an outer diameter of at least one of first body segment 18 and second body segment 20. With a slightly recessed outer diameter, metal specimen 38 can be raised and lowered within wellbore 12 with a reduced chance of causing any damage to metal specimen 38 or otherwise contacting metal specimen 38 with outer members within wellbore 12 or any wellhead assembly located above wellbore 12.

Metal specimen 38 can have an axial length of a number of inches. As an example, metal specimen 38 can have an axial length of one quarter to five inches and in an alternate embodiment, can have an axial length of one inch. In certain embodiments, metal specimen 38 can be sufficiently large in size so that erosion, corrosion, and scale conditions to which metal specimen 38 is subjected accurately reflects actual erosion, corrosion, and scale to which the components of subterranean well 10 are subjected. A smaller coupon of some current designs are instead of a size that the coupon can be exposed to such little area of flow that the conditions within subterranean well 10 cannot be accurately extrapolated from the results.

Each metal specimen 38 can be formed of a of metallic materials that has a composition that is useful for modeling the corrosion, erosion and scaling conditions and flow regimes within wellbore 12. As an example, metal specimen 38 can be in the range of a mild steel to a corrosion resistant alloys, and combinations thereof. In certain embodiments where more than one monitoring tool 16 are used together, the composition of metal specimen 38 of each monitoring tool 16 can be different from the composition of metal specimen 38 of each other monitoring tool.

Some current metal coupon downhole systems are designed with the metal specimens or coupons enclosed within a tool body or shielded from fluid flow. In such an existing design fluid has to travel through slits or past certain obstructions before contacting the corrosion coupon. These metal specimens and coupons would therefore not be subjected to normal, direct and undisturbed flow of fluid through the wellbore and may therefore not provide results that are representative of the actual system conditions.

Because metal specimen 38 of the current application defines an outer diameter of monitoring tool 16, metal specimen 38 is subjected to direct undisturbed flow of fluids through subterranean well 10 when monitoring tool 16 is lowered within subterranean well 10. Therefore metal specimen 38 can be used to closely simulate the corrosion, erosion and scaling conditions and flow regimes within wellbore 12, under typical system conditions. This can be especially important in gas wells where the flow regime is typically annular or is an annular mist where metal specimen 38 is exposed to the fluid flow. Some current test coupon systems are ineffectual in wells with low levels of fluid since the coupon is located within a member that shields the coupon from direct flow and may be exposed to insufficient flow levels to obtain accurate results. Embodiments of this disclosure are instead particularly well suited to high pressure, high temperature wells with low fluid content traveling at high velocity, and in wells with low levels of water being produced.

Metal specimen 38 can be located between annular shoulder 26 and end 40 of second body segment 20. Metal specimen 38 can be isolated or separated from first body segment 18 and second body segment 20, and can be sealed from first body segment 18 and second body segment 20 with mating assemblies. The mating assemblies can provide a pressure barrier so that as monitoring tool 16 so that as monitoring tool 16 is moved from atmospheric pressure conditions to high pressure conditions within wellbore 12, the mating assembly will provide sufficient sealing to prevent the high pressure from passing between the components of monitoring tool 16. In this way, the mating assembly will allow monitoring tool 16 to act as a pressure vessel with the interior of monitoring tool 16 being maintained at atmospheric pressure while the exterior of monitoring tool 16 is exposed to high pressures within wellbore 12. As connection assembly 30 is made up, the seals of the mating assemblies can be energized to form the required seals between the components of monitoring tool 16.

The mating assemblies can include seals 44, 46, 48, spacers 42, 43, or a combination of seals and spacers. Metal specimen 38 can be electrically isolated from direct contact with first body segment 18 and second body segment 20 by spacers and seals that are non-metallic and that can withstand high temperatures and high pressures with deep downhole applications, such as, for example, conditions that exist within a wellbore 12 that is in the range of 10,000-15,000 feet deep. In alternate embodiments wellbore 12 can be less than 10,000 feet or even greater than 15,000 feet deep.

Looking at FIG. 4, the mating assembly can include first body seal 44 can be located between first body segment 18 and metal specimen 38. There can be a first body seal 44 on each side of spacer 42 so that no fluids can pass between first body segment 18 and metal specimen 38. First body seal 44 can be a ring shaped member that sits partially within a groove of first body segment 18, spacer 42 or metal specimen 38, as applicable. Alternately, other known sealing means can be used.

The mating assembly can also include second body seal 46 can be located between second body segment 20 and metal specimen 38. There can be a second body seal 46 on each side of spacer 42 so that no fluids can pass between second body segment 20 and metal specimen 38. Second body seal 46 can be a ring shaped member that sits partially within a groove of second body segment 20, spacer 42 or metal specimen 38, as applicable. Alternately, other known sealing means can be used.

Body spacer 43 can also be a part of the mating assembly. Body spacer 43 can be a spacer and isolating member that circumscribes axial protrusion 24 to separate metal specimen 38 from axial protrusion 24. In the example of FIG. 4, where metal specimen 38 circumscribes a portion of both first body segment 18 and second body segment 20, body spacer 43 can also circumscribe both first body segment 18 and second body segment 20. As connection assembly 30 is tightened, body spacer 43 can maintain a separation between first body segment 18 and second body segment 20 and can also prevent an inner diameter of metal specimen 38 from contacting an outer diameter of axial protrusion 24 of first body segment 18 and second body segment 20. Body spacer 43 can be sized so that it does not interfere with the sealing properties of first body seal 44 and second body seal 46, while assisting to isolate the components of monitoring tool 16.

The example embodiment of FIG. 8 can also include a mating assembly that includes one or more first body seal 44, one or more second body seal 46, and body spacer 43. The mating assembly of FIG. 8 can further include spacer 42 that can be located at each end of metal specimen 38. Spacer 42 can circumscribe axial protrusion 24 and separate metal specimen 38 from first body segment 18 and second body segment 20. Spacers 42 together with annular shoulder 26 and end 40 can act to restrict axial movement of metal specimen 38 relative to first body segment 18 and second body segment 20 when first body segment 18 and second body segment 20 are secured together.

Main body seal 48 can be located between first body segment 18 and second body segment 20. Main body seal 48 can be a ring shaped member that circumscribes axial protrusion 24. Main body seal can seal between first body segment 18 and second body segment 20 to prevent fluids from passing between first body segment 18 and second body segment 20. Each of the first body seal 44, second body seal 46, and main body seal 48 can be formed of high temp non-metallic sealing materials.

Looking at FIG. 8, monitoring tool 16 can further include outer connection 50. Outer connection 50 can be a part of first body segment 18, second body segment 20, or both first body segment 18 and second body segment 20. Outer connection 50 can be used for connecting monitoring tool 16 to intervention member 52 (FIG. 1) during deployment or retrieval of monitoring tool 16. Outer connection 50 can be a male type connector, a female type connector, or other style of connection commonly known for connecting tools to suspension members. In the example of FIG. 2, intervention member 52 can be connected to monitoring tool 16 with a latching mechanism, threaded connection, or other known method commonly used for downhole tools.

Intervention member 52 can extend downhole into wellbore 12 and can raise and lower monitoring tool 16 within subterranean well 10 and position monitoring tool 16 within wellbore 12 at a predetermined location and depth. Intervention member 52 can be, for example, a gauge hanger. Intervention member 52 can have gripping members 53 that can be in a retracted position when lowered into wellbore 12 and that can expand radially outward and grip an inner diameter surface of wellbore 12 when monitoring tool 16 has reached a predetermined location within wellbore 12. Gripping members 53 can provide sufficient gripping force to retain monitoring tool 16 within wellbore 12 without monitoring tool 16 being attached to a wireline, coiled tubing, sucker rod, or other installation string or wire. Intervention member 52 can include or be attached to a shock absorber that can protect monitoring tool 16 from vibration of high velocity well flow within wellbore 12. Outer connection 50 will match a connection required to mate intervention member 52 or a shock absorber to monitoring tool 16. Intervention member 52 can include a fishing neck to allow for retrieval or fishing, if required. Outer connection 50 can also be used to connect monitoring tool 16 to one or more additional monitoring tools 16 or to another downhole tool or tool string component.

In an example of operation, in order to monitor conditions within subterranean well 10 a selected metal specimen 38 can be measured to determine the weight of metal specimen 38. Metal specimen 38 can also be measured to determine a shape or profile of metal specimen 38. The measurements can be performed, for example, by optical means such as white light interferometry.

Metal specimen 38 can then be placed around one of first body segment 18 or second body segment 20. First body segment 18 can be releasably secured to second body segment 20. As an example, axial protrusion 24 can be threaded into inner recess 28 and set screw 36 can be inserted to extend from second body segment 20 to first body segment 18. Alternately, retaining member 31 can extend through first body segment 18 and second body segment 20 to secure first body segment 18 to second body segment 20.

Intervention member 52 can be attached to outer connection 50. In certain embodiments, additional monitoring tools 16 can be suspended from intervention member 52 and the monitoring tools 16 can contain metal specimens 38 with different compositions so that conditions in the wellbore 12 can be measured using a variety of materials. Intervention member 52 can be used to lower monitoring tool 16, as well as any additional members attached to monitoring tool 16, into wellbore 12. Monitoring tool 16 can be lowered to a predetermined location and depth. Monitoring tool 16 can be positioned with in a flow of fluids through subterranean well 10 at a predetermined location so that the outer diameter surface of metal specimen 38 is located in a direct undisturbed flow of the fluids through subterranean well 10. Gripping members 53 can expand radially outward and grip an inner diameter surface of wellbore 12 to retain monitoring tool 16 at the predetermined location within wellbore 12.

After a predetermined amount of time has passed, intervention member 52 can be used to raise monitoring tool 16 out of subterranean well 10. Set screw 36 can be removed and one of first body segment 18 and second body segment 20 can be rotated relative to the other so that axial protrusion 24 is unthreaded from inner recess 28. Metal specimen 38 can be separated from axial protrusion 24 and re-measured. Scale and deposit analysis can be performed on the un-cleaned metal specimen 38 using for example, energy-dispersive X-ray spectroscopy (EDX), energy dispersive X-ray fluorescence (EDF), powder X-ray diffraction (XRD), or other known means. Metal specimen 38 can then be cleaned and measured once again. During each of these measurements, a weight and profile of metal specimen 38 can be determined. The corrosion treatment program and other well optimization decisions relating to subterranean well 10 can then be adjusted, optimized, and improved based on the measurements of metal specimen 38.

Embodiments of the disclosure described herein, therefore, are well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A system for monitoring conditions within a subterranean well, the system comprising:
    a monitoring tool having:
        a first body segment releasably secured to a second body segment, the first body segment having an axial protrusion with a reduced outer diameter;
        a metal specimen circumscribing the axial protrusion so that an outer diameter surface of the metal specimen defines an outer diameter of the monitoring tool;
        a spacer member located between the metal specimen and the axial protrusion, the spacer member being non-metallic and electrically isolating the metal specimen from the axial protrusion, where the spacer member is a solid ring shaped member with a consistent inner diameter and a consistent outer diameter and free of openings through a sidewall of the spacer member, and is removable from both the first body segment and the second body segment and operable to slide over an end of the axial protrusion and be positioned in any radial orientation about the axial protrusion;
        a mating assembly located at each end of the metal specimen and separating the metal specimen from the first body segment and from the second body segment, where axial end faces of the spacer member directly contact one of the mating assemblies; and
        an outer connection in one of the first body segment and the second body segment; and
    an intervention member connected to the outer connection, the intervention member having a gripping member moveable between a retracted position and an extended position, wherein when the gripping member is in the extended position, the intervention member is operable to suspend the monitoring tool within the subterranean well.

2. The system in accordance with claim 1, wherein the outer diameter surface of the metal specimen is located in a direct undisturbed flow of fluids through the subterranean well when the monitoring tool is lowered within the subterranean well.

3. The system in accordance with claim 1, further including the mating assembly isolating the metal specimen from direct contact with the first body segment and the second body segment.

4. The system in accordance with claim 3, wherein the mating assembly is formed of a non-metallic and electrically isolating material.

5. A method for monitoring conditions within a subterranean well, the method comprising:
    providing the system of claim 1; and
    lowering the monitoring tool into the subterranean well with the intervention member.

6. The method in accordance with claim 5, further comprising before lowering the monitoring tool into the subterranean well with the intervention member, measuring at least one of a weight and profile of the metal specimen.

7. The method in accordance with claim 5, further comprising raising the monitoring tool out of the subterranean well with the intervention member and measuring at least one of a weight and profile of the metal specimen.

8. The method in accordance with claim 5, further comprising raising the monitoring tool out of the subterranean well with the intervention member and measuring a feature of the metal specimen, then optimizing a treatment of the subterranean well based on the measurement of the feature, the treatment being one of a scale treatment or a corrosion treatment.

9. The method in accordance with claim 5, further comprising locating the monitoring tool in a flow of fluids through the subterranean well so that the outer diameter surface of the metal specimen is located in a direct undisturbed flow of fluids through the subterranean well.

10. The method in accordance with claim 5, further comprising moving the gripping member of the intervention member to the extended position so that the gripping member engages an inner diameter surface of the subterranean well.

11. The method in accordance with claim 5, further comprising securing one or more additional monitoring tools to the outer connection before lowering the monitoring tool into the subterranean well.

12. The method in accordance with claim 11, wherein a composition of the metal specimen of each monitoring tool is different from the composition of the metal specimen of other monitoring tools.

* * * * *